US 6,649,104 B2

(12) United States Patent
Tadokoro et al.

(10) Patent No.: US 6,649,104 B2
(45) Date of Patent: Nov. 18, 2003

(54) ACRYLIC RESIN FILM AND LAMINATED FILM COMPRISING THE SAME

(75) Inventors: Yoshio Tadokoro, Shiga (JP); Kiyoshi Mutou, Osaka (JP); Kouji Koyama, Osaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/139,403

(22) Filed: May 7, 2002

(65) Prior Publication Data

US 2002/0164490 A1 Nov. 7, 2002

Related U.S. Application Data

(63) Continuation of application No. 09/463,792, filed as application No. PCT/JP98/03412 on Jul. 30, 1998, now abandoned.

(30) Foreign Application Priority Data

Jul. 31, 1997 (JP) .............................. 9-206151
Aug. 28, 1997 (JP) .............................. 9-232267

(51) Int. Cl.$^7$ .................... B29C 63/00; B29C 47/00; D01D 10/00
(52) U.S. Cl. .................. 264/171.1; 264/173.1; 156/244.11
(58) Field of Search .................. 428/323, 327, 428/411.1, 500, 515; 264/171.1, 173.1; 156/244.11

(56) References Cited

U.S. PATENT DOCUMENTS

| 3,793,402 A | | 2/1974 | Owens | 260/876 R |
|---|---|---|---|---|
| 5,063,112 A | * | 11/1991 | Gross et al. | 428/412 |
| 5,169,903 A | | 12/1992 | Toritani et al. | 525/310 |
| 6,147,162 A | * | 11/2000 | Tadokoro et al. | 525/222 |
| 6,172,135 B1 | | 1/2001 | Fraser et al. | 523/201 |

FOREIGN PATENT DOCUMENTS

WO    WO97/30117    *    8/1997

OTHER PUBLICATIONS

Encyclopedia of Polymer Science and Engineering, vol. 1, 1985.*

* cited by examiner

*Primary Examiner*—Paul Thibodeau
*Assistant Examiner*—Sheeba Ahmed
(74) *Attorney, Agent, or Firm*—Birch, Stewart, Kolasch & Birch, LLP

(57) ABSTRACT

An acrylic resin film made from a composition having 95 to 50 wt. parts of an acrylic resin having a glass transition temperature of 60 to 110° C. and a weight average molecular weight of 70,000 to 600,000, and 5 to 50 wt. parts of a multilayer-structured acrylic polymer containing an elastomeric layer, and a multilayer film having the above acrylic resin film and other resin film. These films have better thickness accuracy, surface smoothness and surface hardness than conventional acrylic resin films, with excellent properties as films for use in simultaneous injection molding and lamination, agricultural films, display films, masking films, paint-substitute films, and the like.

3 Claims, No Drawings

ACRYLIC RESIN FILM AND LAMINATED FILM COMPRISING THE SAME

This application is a continuation of co-pending application Ser. No. 09/463,792, filed on Jan. 31, 2000, now abandoned, and for which priority is claimed under 35 U.S.C. §120. Application Ser. No. 09/463,792 is the national phase of PCT International Application No. PCT/JP98/03412 filed on Jul. 30, 1998 under 35 U.S.C. §371. The entire contents of each of the above-identified applications are hereby incorporated by reference. This application also claims priority of application Ser. Nos. 206151/1997 and 232267/1997 filed in Japan on Jul. 31, 1997 and Aug. 28, 1997, respectively, under 35 U.S.C. §119.

FIELD OF THE INVENTION

The present invention relates to an acrylic resin film, a laminated film comprising the same and the use thereof.

BACKGROUND OF THE INVENTION

Molded articles produced by injection molding have been used as interior parts of automobiles, exterior parts of electric home appliances, and the like. For the decoration of such molded articles, a resin film having a decoration is laminated at the same time as the molding of the articles by simultaneous injection molding and lamination methods.

Simultaneous injection molding and lamination methods are such that a film inserted into a cavity between the male and female molds is unified with a molten resin injected into the mold cavity at the time of injection molding so as to apply the film on the surface of a molded article (see JP-B-63-6339 (U.S. Pat. No. 4,639,341), JP-B-4-9647 and JP-A-7-9484). Such molding methods may be referred to as lamination or transfer printing methods according to the different types of films used. Acrylic resin films are popular as films to be used in the simultaneous injection molding and lamination methods, and they have printed designs on one or both of their surfaces.

Acrylic resin films are also used for covering the surfaces of polycarbonate resin sheets, etc., since they have good weather resistance (see JP-B-47-19119 and JP-A-55-59929).

However, conventional acrylic resin films are unsatisfactory in thickness accuracy, surface smoothness, surface hardness, and the like.

Thus, the present inventors have made vigorous studies to develop an acrylic resin film having good thickness accuracy, surface smoothness and surface hardness at the same time. As a result, it has been found that a film made from a composition comprising an acrylic resin having a glass transition temperature of 60 to 110° C. and a weight average molecular weight of 70,000 to 600,000, and a multilayer-structured acrylic polymer containing an elastomeric layer has good thickness accuracy, surface smoothness and surface hardness, and further that an acrylic resin film and a laminated film comprising such an acrylic film are useful as lamination films for use in simultaneous injection molding and lamination methods, agricultural films, display films, masking films and paint-substitute films, and the like, and in particular, these films, which are colored or printed with designs, have the good printing properties of designs and can give added depth to the printed designs when the film is laminated on a molded article, in comparison with conventional acrylic resin films.

BRIEF SUMMARY OF THE INVENTION

The present invention provides an acrylic resin film made from a composition comprising 95 to 50 wt. parts of an acrylic resin having a glass transition temperature of 60 to 110° C. and a weight average molecular weight of 70,000 to 600,000, and 5 to 50 wt. parts of a multilayer-structured acrylic polymer containing an elastomeric layer. The present invention provides also a colored film comprising such an acrylic resin film, which can give added depth or a metallic color to a molded article, when the film is laminated on the article.

Furthermore, the present invention provides a laminated film comprising such an acrylic resin film and a film of other material such as a soft vinyl chloride resin.

The present invention provides a laminated molded article comprising a resin molded article of, for example, a polycarbonate resin, and such an acrylic resin film or such a laminated film which is laminated on the molded article.

In addition, the present invention relates to the use of such an acrylic film, a colored film or a laminated film, as an agricultural film, a display film, a masking film or a paint-substitute film.

The acrylic resin of the present invention should have a glass transition temperature of 60 to 110° C., preferably about 75 to 105° C., while acrylic resins generally have a glass transition temperature of about 30 to 110° C.

Herein, a glass transition temperature is measured using a differential scanning calorimeter (DSC) at a heating rate of 10° C./min. under a nitrogen stream, and a temperature at which an endothermic change starts is regarded as a glass transition temperature.

When the glass transition temperature is lower than 60° C., the acrylic resin film may not have sufficient surface hardness. An acrylic resin having a glass temperature of higher than 110° C. has a crosslinked structure, and is difficult to mold.

DETAILED DESCRIPTION OF THE INVENTION

The acrylic resin of the present invention should have a weight average molecular weight of about 70,000 to 600,000, preferably about 120,000 to 300,000. The weight average molecular weight of the acrylic resin is measured by any conventional method such as gel permeation chromatography (GPC), and the like.

When the weight average molecular weight of the acrylic resin is less than about 70,000, the processability of the resin deteriorates when the resin is molded in the form of a film, and sufficient thickness accuracy may not be attained. When the weight average molecular weight exceeds about 600,000, the molding of the resin in the form of a film becomes difficult, and gel-like materials tend to form in the film.

Examples of such acrylic resins include polyalkyl methacrylate resins, copolymers of an alkyl methacrylate and an alkyl acrylate, and the like. The copolymer of an alkyl methacrylate and an alkyl acrylate preferably comprises about 50 to 99 wt. % of the alkyl methacrylate and about 50 to 1 wt. % of the alkyl acrylate.

Examples of the alkyl methacrylate are methyl methacrylate, and the like. Examples of an alkyl group in the alkyl acrylate are alkyl groups having 2 to 10 carbon atoms. Specific examples of the alkyl acrylate are ethyl acrylate, n-propyl acrylate, isopropyl acrylate, n-butyl acrylate, isobutyl acrylate, hexyl acrylate, octyl acrylate, etc.

Such acrylic resins can be prepared by any known polymerization methods such as bulk polymerization and suspension polymerization methods.

The glass transition temperature of the acrylic resin can be controlled by the selection of the amounts and kinds of comonomers. The glass transition temperature increases, as the amount of a comonomer decreases, while the glass transition temperature decreases, as the molecular weight of a comonomer increases.

The weight average molecular weight of the acrylic resin can be adjusted by the selection of the kind and amount of a polymerization initiator, the kind and amount of a chain transfer agent, and a polymerization temperature.

The acrylic resin to be used in the present invention may be an as-produced resin containing no other polymer, or may be a mixture of two or more resins having different glass transition temperatures or different average molecular weights.

Acrylic resins having a glass transition temperature outside the range of about 60 to 110° C. or a weight average molecular weight outside the range of about 70,000 to 600,000 may be used, when their mixtures have a glass transition temperature of about 60 to 110° C. or a weight average molecular weight of about 70,000 to 600,000.

In particular, a resin mixture comprising at least one acrylic resin having a weight average molecular weight of about 70,000 to 200,000 is preferable from the viewpoint of the surface hardness of a film. Furthermore, a mixture comprising at least one acrylic resin having a weight average molecular weight of about 70,000 to 200,000 and at least one acrylic resin having a weight average molecular weight of about 150,000 to 700,000 is preferable, since unevenness of the film in the thermoforming of the film can be prevented, and the sufficient surface hardness is attained.

When a molecular weight distribution of such a resin mixture is analyzed on a chart obtained by GPC, a peak has a bottom-spreading shape, or is accompanied with a shoulder in relation to the molecular weight. The glass transition temperature of a resin having a weight average molecular weight of about 70,000 to 200,000 is preferably from about 90 to 110° C., while that of a resin having a weight average molecular weight of about 150,000 to 700,000 is preferably from about 40 to 80° C.

The multilayer-structured acrylic polymer containing an elastomeric layer used in the present invention is preferably a multilayer structure acrylic polymer having at least two layers, preferably at least three layers.

Examples of the multilayer-structured acrylic polymer are (1) a two-layer-structured acrylic polymer consisting of the inner layer made from an elastomer which comprises an alkyl acrylate having 4 to 8 carbon atoms in the alkyl group and a polyfunctional monomer such as allyl methacrylate, etc, and the outer layer made from a hard polymer which comprises methyl methacrylate as a main component, (2) a three-layer-structured acrylic polymer consisting of the innermost layer made from a hard polymer which comprises methyl methacrylate as a main component, the intermediate layer made from an elastomer which comprises an alkyl acrylate having 4 to 8 carbon atoms in the alkyl group and a polyfunctional monomer such as allyl methacrylate, and the outermost layer made from a hard polymer comprising methyl methacrylate as a main component. Such multilayer-structured acrylic resins may be prepared by a method disclosed in, for example, JP-B-55-27576 (U.S. Pat. No. 3,793,402).

The multilayer-structured acrylic polymer having an elastomeric layer has a particle size of about 100 to 500 nm, preferably about 100 to 400 nm, more preferably about 250 to 350 nm. When the particle size is less than about 100 nm, the surface hardness of the film tends to deteriorate. When the particle size exceeds about 500 nm, the transparency of the film tends to decrease.

The acrylic resin composition of the present invention comprises about 95 to 50 wt. parts of the acrylic resin and about 5 to 50 wt. parts of the multilayer-structured acrylic polymer having an elastomeric layer, provided that the total amount of the acrylic resin and the multilayer-structured acrylic polymer having an elastomeric layer is 100 wt. parts. When the amount of the multilayer-structured acrylic polymer having an elastomeric layer is less than about 5 wt. parts, it may be difficult to form a film from a composition. When the amount of the multilayer-structured acrylic polymer having an elastomeric layer exceeds about 50 wt. parts, the surface hardness of the film tends to decrease. Preferably, the composition comprises about 90 to 70 wt. parts of the acrylic resin and about 10 to 30 wt. parts of the multilayer-structured acrylic polymer having an elastomeric layer.

The film of the present invention may contain other polymer components, additives, and the like, insofar as the properties of the film of the present invention are not impaired.

Examples of the other polymer components include fluororesins (e.g. polyvinylidene fluoride, etc.), MS (methyl methacrylate-styrene) resins, and the like. Examples of the additives include weather-resistant agents such as ultraviolet (UV) radiation absorbers, antioxidants, light-stabilizers, etc.; colorants such as dyes, pigments, etc.; flame-retardants; inorganic fillers; and the like.

Examples of the UV radiation absorbers include benzotriazole-based UV radiation absorbers, 2-hydroxybenzophenone-based UV radiation absorbers, phenyl salicylate-based UV radiation absorbers, benzophenone-based UV radiation absorbers, and their mixtures.

Specific examples of the benzotriazole-based UV radiation absorbers are 2,2-methylenebis[4-(1,1,3,3-tetramethylenebutyl)-6-(2H-benzotriazol-2-yl)phenol], 2-(5-methyl-2-hydroxyphenyl)benzotriazole, 2-[2-hydroxy-3,5-bis(α, α-dimethylbenzyl)phenyl]-2H-benzotriazole, 2-(3,5-di-tart.-butyl-2-hydroxyphenyl)benzotriazole, 2-(3-tert.-butyl-5-methyl-2-hydroxyphenyl)-5-chlorobenzotriazole, 2-(3,5-di-tert.-butyl-2-hydroxyphenyl)-5-chlorobenzotriazole, 2-(3,5-di-tert.-amyl-2-hydroxyphenyl)benzotriazole, 2-(2'-hydroxy-5'-tert.-octylphenyl)benzotriazole, etc.

Specific examples of the 2-hydroxybenzophenone-based UV radiation absorbers are 2-hydroxy-4-methoxybenzophenone, 2-hydroxy-4-octoxybenzophenone, 2,4-dihydroxylbenzophenone, 2-hydroxy-4-methoxy-4'-chlorobenzophenone, 2,2-dihydroxy-4-methoxybenzophenone, 2,2-dihydroxy-4,4'-dimethoxybenzophenone, etc.

Specific examples of the phenyl salicylate-based UV radiation absorbers are para-tert.-butylphenyl salicylate, para-octylphenyl salicylate, etc.

The UV radiation absorbers are used singly or in admixture of two or more of them.

Among the above UV radiation absorbers, high molecular weight benzotriazole-based UV radiation absorbers such as 2,2-methylenebis[6-(2H-benzotriazol-2-yl)-4-(1,1,3,3-tetramethylbutyl)phenol], etc. are preferable, since they generate less volatiles from the film, and can prevent the deterioration of designs printed on the film.

When such UV radiation absorbers are used, the amount of the UV radiation absorbers is at least about 0.1 wt. part, preferably about 0.3 to 2 wt. parts, per 100 wt. parts of the acrylic resin composition.

Examples of the antioxidants include hindered phenol-based antioxidants, phosphorus-based antioxidants, sulfurbased antioxidants, etc., and examples of the light stabilizers include hindered amine-based light stabilizers, etc.

The acrylic resin composition of the present invention can be prepared, for example, by kneading the acrylic resin and the multilayer-structured polymer having an elastomeric layer. When the other polymers or additives are compounded, they may be contained in the acrylic resin, or the multilayer-structured polymer having an elastomeric layer. Alternatively, they may be added when the acrylic resin and multilayer-structured polymer having an elastomeric layer are kneaded. The kneading conditions are not limited and may be the same as conventional kneading conditions.

The acrylic resin composition of the present invention can be molded in the form of a film by various conventional methods, for example, a method comprising extrusion molding the composition in the form of a film and then allowing one or both of the surfaces of the film-form composition to touch roll surfaces, a belt-cooling extrusion method in which the composition is extruded in the form of a film and the film-form composition touches a belt at one or both surfaces of the film, an inflation extrusion method, an extrusion casting method with chill-rolls, a solvent casting method, or the like.

In particular, the film is preferably formed with the both surfaces of the extruded film-form composition touching the roll surfaces or belt surfaces, from the viewpoint of the thickness accuracy and surface smoothness of the film. In this case, the both surfaces of the film-form composition preferably touch the roll or belt surfaces at the same time, although one surface touches the roll or belt surface, and then the other surface touches the roll or belt surface.

The temperature of the film-form composition, when the both surfaces firstly touch the roll or belt surfaces, is not lower than the glass transition temperature of the acrylic resin composition, preferably at least about 20° C. higher than the glass transition temperature.

A linear pressure to touch the film-form composition to the roll or belt is from about 50 to 150 kg/cm, preferably from 70 to 120 kg/cm.

The material of the surface of a roll or a belt is a metal, since the metal has a good cooling efficiency, and a film having good surface smoothness can be obtained. Specific examples of the metal are stainless steel, steel, etc. When steel is used, the surface of a roll or belt is preferably treated with, for example, chrome plating.

The surface temperature of the roll or belt is not limited. The surface temperature is preferably kept constant for the smooth formation of a film.

The number of metal rolls is preferably three or four, and the film thickness and surface condition of the formed film are adjusted by a multi-step process.

The film produced by the above method has sufficient thickness accuracy and surface smoothness. For further improvement of the surface accuracy and surface smoothness, one or both of the surfaces of the film can be heated and then cooled while touching to the surfaces of the rolls or belts.

The appearance or printing properties of the acrylic resin film of the present invention may be more sensitive to the presence of foreign materials than the conventional acrylic resin films, even if the particle size of the foreign material is 100 μm or less. Thus, it is preferable to mold the composition in the form of a film after the removal of such foreign materials. Practically, when the foreign materials are present on the surface of the film, printing mistakes tend to occur when designs are printed on one or both of the film surfaces.

Foreign particles are preferably removed with a screen mesh made of a metal or a ceramic which is provided in a conduit through which the melt of the acrylic resin composition passes. In particular, a rotary type screen changer is preferably used, since it is less clogged and requires fewer interruptions of a production process for the removal of clogs. Examples of such a rotary type screen changer are TYPE KSF-45X2 of GUNEUS (Germany), and the like. An acrylic resin film containing substantially no foreign materials having a particle size of 100 μm or less can be produced by molding a resin melt by extruding it with the provision of such a rotary type screen changer in a conduit for the resin melt.

The thickness of the acrylic resin film of the present invention is usually from about 0.05 to 1 mm, preferably from about 0.1 to 0.6 mm. The term "film" is intended to include not only a film-form material but also a sheet-form one.

The acrylic resin film of the present invention may be printed with designs on one or both of its surfaces, or may be colored. Furthermore, the acrylic resin film of the present invention may be colored and printed with designs. When designs are printed on the colored acrylic resin film of the present invention, no base primer printing for printed designs may be necessary.

For coloring an acrylic resin film, a colored resin may be used as a raw material, or a transparent resin film may be dyed in a subsequent step. As an example of the dyeing of a film, a film is dyed by dipping the film in an aqueous liquid comprising water and 10 to 30 g/liter-water of an alcohol such as benzyl alcohol, and containing a disperse dye dispersed therein.

A pressure-sensitive adhesive or adhesive layer (hereinafter referred to as "adhesive" collectively) may be formed on one surface of the acrylic resin film of the present invention. An adhesive layer may be formed by any conventional method, for example, by coating an adhesive.

The acrylic resin film of the present invention has satisfactory thickness accuracy, good surface smoothness, and also sufficient surface hardness. Therefore, the acrylic resin film can be used as a film for use in simultaneous injection molding and lamination, an agricultural film, a display film, a masking film, and the like.

A simultaneous injection molding and lamination method using the acrylic resin film of the present invention may be carried out, for example, by opening a pair of male and female molds which form a cavity space between them, inserting the acrylic resin film of the present invention into between the male and female molds, closing the molds with pinching the film between the molds, injecting the melt of a thermoplastic resin in the cavity space of the molds, and cooling the molds and resin to obtain a molded article comprising the molded body of the thermoplastic resin and the film of the present invention laminated on the molded body.

The acrylic resin film of the present invention may be preshaped by vacuum molding, etc. in a desired form prior to the supply of the film into between male and female molds. In this case, the thickness of the film is preferably from about 0.1 to 0.5 mm from the viewpoint of moldability. When the film is preshaped in a desired form, the film may be preshaped using one of male and female molds and used in the simultaneous injection molding and lamination without removing the preshaped film from the mold, although the film may be preshaped using a mold for preshaping and then supplied into between the male and female molds for injection molding.

One piece of a film can be supplied into a mold cavity in each molding step, while a continuous film may be continuously supplied into a mold cavity from a film roll. In the latter case, a film thickness is preferably about 0.6 mm or less since such a thin film is easily taken up in the form of a roll. Furthermore, a film thickness is preferably about 0.2 mm or less from the view point of a roll weight. When a film thickness is larger than 0.2 mm, it is advantageous to supply the cut piece of a film into a mold cavity.

When the transparent acrylic resin film of the present invention which has a printed design on one of its surfaces is used, and the melt of a thermoplastic resin is supplied on the surface of the film having the printed design, the added depth is preferably given to the design since the transparent film is present on the design and functions as a clear layer in the laminated molded article. In this case, a film thickness is preferably about 0.1 mm or larger, since the molded article has the sufficient depth of the printed design.

As a thermoplastic resin which is injected into the mold, for example, acrylonitrile-butadiene-styrene (ABS) resins, polycarbonate resins, polystyrene resins, or polyolefin resins can be used. Among them, the ABS, polycarbonate and impact-resistant polypropylene resins are preferably selected in view of the impact resistance, dimensional stability and the like of the laminated molded articles.

Preferably, a thermoplastic resin contains an acrylic resin, since the adhesion strength of the resin film of the present invention to the thermoplastic resin body of the laminated molded article increases. When a thermoplastic resin contains an acrylic resin, the content of the acrylic resin is about 10 wt. % or lower of the weight of the thermoplastic resin.

The temperature of a thermoplastic resin, an injection pressure and the like in the injection molding are suitably selected in accordance with the kind of a resin to be injected, the type of a laminated molded article to be obtained, the position of a gate in the molds, and the like.

When olefin resins are used as thermoplastic resins, the acrylic resin film of the present invention may have a primer on a surface on which the injected thermoplastic resin is laminated, to impart the adhesion properties to the acrylic film of the present invention. The primer may be formed by coating, for example, chlorinated polypropylene resins, and the like.

The acrylic resin film of the present invention has good transparency, a low transmission for a light beam having a wavelength of 3000 nm or longer (far-infrared radiation), and also good heat resistance, like conventional acrylic resin films. The acrylic resin film of the present invention can be used as an agricultural film, since it has a larger surface hardness than conventional acrylic resin films. Conventional acrylic resin films have a low surface hardness, and therefore their transparency deteriorates due to abrasion with dusts, sands, etc. when they are used for a long time. Thus the conventional acrylic resin films are not suitable as agricultural films. In contrast with the conventional acrylic resin films, the acrylic resin film of the present invention has a sufficient surface hardness, and its transparency is not lowered greatly by the abrasion with dusts, sands, etc. Therefore, the acrylic resin film of the present invention is practically used as an agricultural film.

When the acrylic resin film of the present invention is used as an agricultural film, at least one of hydrophilic polymers, surfactants, and the like may be contained in the film or coated on the surface of the film to impart anti-fogging properties to the film. The hydrophilic polymers and surfactants may be compounded in the film or coated on the surface of the film by any conventional methods.

The acrylic resin film of the present invention has good surface smoothness. Therefore, one surface of the film can be printed with ink jet printers, by gravure printing or screen printing, etc.

The acrylic resin film of the present invention can have an adhesive layer on an opposite surface to the printed surface, and can be used as a display film for exterior decoration, advertisement, and the like, that is, as a marking film. Such a display film is printed with characters, pictures, photographs, and the like with ink jet printers assisted by the computer graphic technology.

The display film consisting of the acrylic resin film of the present invention has better weather resistance and better appearance of designs due to the transparency of the acrylic resin film than conventionally used display films, for example, soft vinyl chloride resin films, polyurethane resin films, polyethylene terephthalate film, and the like.

When the acrylic resin film of the present invention is used as a display film, it preferably has a total light transmittance (Tt) of at least 91% and a haze of 2% or less.

The thickness of the adhesive layer formed on one surface of the acrylic resin film is preferably from about 15 to 60 μm. Examples of the adhesive include an acrylic adhesive which is prepared by radically polymerizing a vinyl monomer composition comprising an acrylic vinyl monomer and vinyl acetate in a solution, a polyurethane-based adhesive, and the like. Such an adhesive layer can be formed by applying an adhesive to a release material by any coating methods such as a reverse roll coating method, heating and drying the applied adhesive, and laminating it onto the acrylic resin film. Herein, any releasing material can be used. For example, a silicone-coated release paper and the like are used.

The display film is cut in desired sizes and shapes such as figures, characters, etc., and laminated on a substrate after peeling off the release material.

Examples of the substrate are plastic molded articles, glass, metals, wall materials, wood, and the like.

Examples of the plastics are acrylic resins, acrylonitrile-butadiene-styrene (ABS) resins, polycarbonate resins, vinyl chloride resins, polystyrene resins, polyolefin resins, and the like.

Such a display film can be used as outdoor signboards (e.g. rooftop signboards, side wall signboards, poled signboards, field signboards, canopy signboards, etc.), directional signs (e.g. lead-in signs, pilot signs, guide signs, station signs, etc.), markings on business vehicles (e.g. fleet markings), markings on shutters and walls, markings on fences surrounding factories, works, construction sites, etc., markings on vending machines, markings on construction machines, markings on railcars, makings on ships, markings on canvas sheets, decorative displays as inline parts of automobiles, trucks, motorcycles, etc., interior decorations such as wallpapers, wainscots, imitations, etc.

The acrylic resin film of the present invention can be used as a masking film which is used to protect substrates, since it has good transparency.

A polyethylene film having an adhesive layer has been used as a masking film. However, since the polyethylene resin has crystallinity and is translucent in general, the masking film comprising the polyethylene film has to be peeled off prior to the visually inspection of a synthetic resin plate which is masked with such a masking film. Furthermore, since the polyethylene film tends to cause optical distortion (optical anisotropy), the masking film comprising the polyethylene resin has to be peeled off prior to the examination of the optical distortion and the like of an optical film which is masked with such a masking film.

In contrast, a masking film comprising the acrylic resin film of the present invention has good transparency. Therefore, acrylic resin plates, polycarbonate rein plates and the like can be visually inspected without peeling off the masking film. In addition, when a masking film comprising the acrylic resin film of the present invention is used as a masking film for an optical film such as a polarized light film, a phase retarder film, etc., the optical distortion or retardation of the optical film can be examined without peeling off the masking film, since the masking film causes no optical distortion.

The acrylic resin film of the present invention can be produced in the form of a laminated film having other film layer on one surface thereof. Examples of the other film include films of conventional acrylic resins, vinyl chloride resins, acrylonitrile-butadiene-styrene copolymers, polycarbonate resins, olefin resins, and the like.

The thickness of the other film is not limited, but is usually from about 0.05 to 5 mm, preferably from about 0.1 to 3 mm. The other film layer may be a single layer, or a multi-layer.

Such a laminated film may be produced by a multilayer extrusion molding method in which the acrylic resin film of the present invention and the other film are coextruded and laminated, or by adhering the acrylic resin film of the present invention and the other film, which have been produced in separate steps. Alternatively, the other film is extrusion molded, and immediately, the acrylic resin film of the present invention is laminated on the other film while the latter is hot. Just after the lamination, the laminate of the acrylic resin film of the present invention and the other film is allowed to touch the surface of a roll or a belt to obtain a laminated film.

Such a laminated film is preferably used with the acrylic resin film of the present invention facing outside when a film other than an acrylic resin film is used as other film, since the surface of the laminated film has a clear and transparent appearance.

When a laminated film consists of the acrylic resin film of the present invention and other acrylic resin film, it can be used with the other acrylic resin layer (for example, an acrylic resin film containing no elastomer) constituting the outer layer, while the acrylic resin layer of the present invention constituting the inner layer. In this case, the laminated film has excellent surface hardness, chemical resistance, weather resistance, and the like.

Furthermore, such a laminated film can be taken up in the form of a roll, while it is difficult to take up conventional acrylic resin films in the form of a roll.

Among such laminated films, a laminated film comprising a colorless acrylic resin film and a colored acrylic resin film, or a laminated film comprising a colorless acrylic resin film and a colored olefin resin film, in particular, an impact-resistant polypropylene resin film has an effect such that the colored film layer can be seen with added depth through the colorless acrylic resin film, and thus the high quality appearance is further improved.

When either the colorless film layer or the colored film layer contains 1 to 10 wt. % of a metal powder, in particular, a flat-particle aluminum powder, or mica, the laminated film has a color which is commonly called as a metallic or pearlescent color.

Such laminated films are useful as automobile exterior plates such as bumpers, garnishes, side braids, etc; paint substitutes for electric home appliances such as refrigerators, air conditioners, washing machines, etc; and the like, since the films have good weather-resistance and surface hardness. The use of the laminated films as paint substitutes can prevent environmental pollution caused by organic solvents contained in common paints.

Such a laminated film is usually used with the colorless acrylic resin film facing outside. As substrates, injection molded articles of other resins, metals which are laminated, and the like can be used.

When an acrylic resin film and a colored olefin resin film are adhered, it is advantageous to compound a chlorinated polypropylene resin, an ethylene-methyl methacrylate copolymer resin, a maleic anhydride-modified polypropylene resin, etc. in the olefin resin film, or to apply such a resin onto the surface of the olefin resin film.

Furthermore, it is possible to laminate an acrylic resin film and a colored olefin resin with a urethane-based adhesive, etc.

In the case of a laminated film, designs may be printed on the surface of an acrylic resin film or other film. For example, when the other film layer is a vinyl chloride resin film, designs can be easily printed on one surface of the other film, and the acrylic resin film of the present invention is laminated on the printed surface of the other film, to obtain a laminated film having transparency and good design quality. The acrylic resin film of the present invention and the vinyl chloride resin film can be laminated by heating and pressing them at a temperature of about 80 to 200° C.

The laminated films can be used as agricultural materials, such as materials of green houses; construction materials such as arcade roofs and sounding boards; exterior materials such as sunroofs; and the like.

The laminated films can be used as films for use in the simultaneous injection molding and lamination, agricultural films, display films, etc. like the single-layer acrylic resin films.

When the laminated films are used in the simultaneous injection molding and lamination, they may be used in the same way as that described in connection with the acrylic resin film of the present invention.

When the laminated films are used as agricultural films, other films are preferably vinyl chloride resin films, polyolefin resin films, polyvinyl alcohol resin films, polyethylene terephthalate films, polycarbonate films, and the like.

When the laminated films are used as display films, they are used with the acrylic resin film of the present invention constituting the outermost layer, and an adhesive layer is formed on the surface of the other film layer. The other film layer may be colored, or designs may be present between the acrylic resin film of the present invention and the other film. The designs can be seen with added depth and the design quality is improved, when the acrylic resin film of the present invention constitutes the outermost layer.

The acrylic resin film of such a display film preferably has a total light transmittance (Tt) of at least 91%, and a haze of not larger than 2%.

The kind of an adhesive and the thickness of the adhesive layer formed on one surface are the same as those for the display film consisting of a single layer acrylic resin film, and the adhesive layer can be formed by the same method as that described above. The usage and applications of the laminated display film are the same as those of the display film consisting of the acrylic resin film of the present invention.

The acrylic resin film of the present invention and the multilayer film comprising the same are suitable for various applications such as a film for use in the simultaneous injection molding and lamination, an agricultural film, a display film, a masking film and a paint-substitute film. In particular, colored or printed films comprising the acrylic resin film of the present invention or the multilayer film comprising the same have better added depth, high-quality appearance and printing properties of designs than conventional acrylic resin films.

BEST MODE FOR CARRYING OUT THE INVENTION

The present invention will be illustrated by examples, which do not limit the scope of the invention in any way.

The evaluation methods are as follows:

(1) Thickness accuracy

The thickness of a film was measured with a dial gauge having an accuracy of $\frac{1}{1000}$ mm continuously in the transverse and machine directions of the film over the length of one meter in each direction, and an average thickness ($d_0$), a maximum thickness ($d_{max}$) and a minimum thickness ($d_{min}$) were obtained. The thickness accuracy was calculated according to the equation:

$$\text{Thickness accuracy }(\%) = (\Delta d/d_0) \times 100 \quad (1)$$

in which $\Delta d$ is a difference between the average thickness ($d_0$) and the maximum thickness ($d_{max}$) or a difference between the average thickness ($d_0$) and the minimum thickness ($d_{min}$) whichever the larger.

(2) Formation of unevenness during molding

The surface condition of an obtained molded article was observed with an eye, and ranked according to the following criteria:

A: Substantially no unevenness was observed on the surface.

B: Unevenness was slightly observed on the surface.

C: Minute unevenness was observed on the surface.

(3) Gauze abrasion resistance

A piece of gauze was set on a measuring tool of an abrasion tester Model D for a color fastness test of dyeing (manufactured by TOYO SEIKI SEISAKUSHO), and a film was subjected to an abrasion test for 500 times under a load of 200 g. The abraded state of the film was observed with an eye, and ranked according to the following criteria:

A: No abrasion was observed.

B: Abrasion was slightly observed.

C: Abrasion was clearly observed.

(4) Surface hardness

The pencil hardness of a film was measured according to JIS K 5400.

(5) Optical properties

A total light transmittance (Tt) and a haze were measured according to JIS K 6718.

(6) Glass transition temperature (Tg)

A film sample was heated with a differential scanning calorimeter (DSC) at a heating rate of 10° C./min. under a nitrogen stream, and a temperature at which the endothermic change started was recorded according to a tangent method.

(7) Weight average molecular weight

The weight average molecular weight of a resin was measured by gel permeation chromatography (GPC).

(8) Number of printing mistakes

A design was gravure printed on one side of a film, and the film having an area of about 1 m in width and about 10 m in length was examined with an eye. Then, the number of dropouts of printing was counted and converted into the number per one square meter ($m^2$).

The symbols used in the Examples have the following meanings:

1) Acrylic Resin I

Acrylic Resin I is an acrylic resin prepared by bulk polymerization, comprises 99 wt. % of methyl methacrylate units and 1 wt. % of methyl acrylate units, and has a glass transition temperature of 106° C. and a weight average molecular weight of 140,000.

2) Acrylic Resin II

Acrylic Resin II is an acrylic resin prepared by bulk polymerization, comprises 90 wt. % of methyl methacrylate units and 10 wt. % of methyl acrylate units, and has a glass transition temperature of 95° C. and a weight average molecular weight of 120,000.

3) Acrylic Resin III

Acrylic Resin III is an acrylic resin prepared by suspension polymerization, comprises 80 wt. % of methyl methacrylate units and 20 wt. % of butyl acrylate units, and has a glass transition temperature of 62° C. and a weight average molecular weight of 300,000.

4) Acrylic Resin IV

Acrylic Resin IV is an acrylic resin prepared by suspension polymerization, comprises 80 wt. % of methyl methacrylate units and 20 wt. % of butyl acrylate units, and has a glass transition temperature of 62° C. and a weight average molecular weight of 500,000.

5) Acrylic Resin V

Acrylic Resin V is an acrylic resin prepared by suspension polymerization, comprises 70 wt. % of methyl methacrylate units and 30 wt. % of methyl acrylate units, and has a glass transition temperature of 47° C. and a weight average molecular weight of 300,000.

6) Acrylic Polymer A

Acrylic Polymer A is a three-layer-structured acrylic polymer consisting of an innermost layer made from a crosslinked polymethyl methacrylate, an intermediate layer made from a soft elastomer comprising butyl acrylate as a main component, and an outermost layer made from polymethyl methacrylate, and having an average particle size of about 300 nm, which is prepared by the below described method in accordance with Example 3 of JP-B-55-27576, and In a glass vessel equipped with a condenser, distilled water (100 wt. parts), calcium carbonate as a pH-regulator, dioctyl sulfosuccinate as an emulsifier and potassium persulfate as a polymerization initiator were charged, and then methyl acrylate (38 wt. parts) and allyl methacrylate (0.08 wt. part) were charged. The mixture was reacted at 70° C. for 30 minutes to obtain the polymer of the innermost layer.

Next, a monomer mixture of butyl acrylate (38 wt. parts), styrene (9 wt. parts) and allyl methacrylate (1 wt. part), and a mixture of potassium persulfate and dioctyl sulfosuccinate were continuously added over 90 minutes, followed by the maintenance of the reaction mixture at 85° C. to obtain the crosslinked elastomer layer of the intermediate layer.

Finally, a mixture of methyl methacrylate (14 wt. parts), ethyl acrylate (0.6 wt. part) and potassium persulfate was continuously added over 60 minutes and maintained at 85° C. for 60 minutes to polymerize the outermost layer. Thus, the three-layer-structured polymer was obtained.

The final average particle size of the polymer particles was 300 nm when measured with an electron microscope.

The obtained polymer latex was coagulated by a conventional method, and the coagulate was dehydrated and dried to obtain a dried powder.

7) Acrylic Polymer B

Acrylic Polymer B is a two-layer-structured acrylic polymer consisting of an inner layer made from a soft elastomer comprising butyl acrylate as a main component and an outer layer made from polymethyl methacrylate, and having an average particle size of about 300 nm, which is prepared in the same manner as that for the preparation of Acrylic Polymer A except that no innermost layer is formed.

8) UV radiation absorber LA 31

ADECASTAB™ LA-31 (high molecular weight benzotriazole based) manufactured by ASAHI DENKA INDUSTRIES, LTD.

9) UV radiation absorber 250

SUMISORB™ 250 manufactured by Sumitomo Chemical Co., Ltd.

10) Aluminum powder

An aluminum paste manufactured by TOYO ALUMINUM Co., Ltd.

11) Titanium oxide powder

A titanium oxide powder manufactured by KANTO Chemical Co., Ltd.

12) Disperse dye

SUMIKALON RED™ E-FBL manufactured by Sumitomo Chemical Co., Ltd.

REFERENCE EXAMPLE

The materials shown in Table 1 were mixed with a tumbler mixer in amounts shown in Table 1, and melt and kneaded with a twin-screw extruder in which the screws rotated in the same direction while maintaining the resin temperature at 255° C., and the pellets of acrylic resin compositions a through i were obtained.

EXAMPLES 1–8

The pellets of each acrylic resin composition shown in Table 2 was extrusion molded with a single-screw extruder (a barrel type having a diameter of 65 mm, manufactured by Toshiba Machine Co., Ltd.) through a T-shaped film die (a lip clearance of 0.5 mm and a width of 600 mm; a setting temperature of 250° C.) to obtain a film. Immediately, the film was cooled by allowing the both surfaces in entire contact with cooling polishing rolls at the same time to obtain an acrylic resin film having a thickness of 0.13 mm.

The results of the evaluation of this film are shown in Table 2.

A woodgrain pattern was printed on one surface of this film, and placed in the cavity of an injection molding mold consisting of male and female mold halves which were heated at 50° C., and heated with a far-infrared heater. Then, the film was vacuum shaped.

Thereafter, the melt of a heated ABS resin (at a resin temperature of 230° C.) was injected in the mold under an injection pressure of 1150 kg/cm$^2$, and then cooled to obtain the laminated molded article consisting of the molded body of the ABS resin and the acrylic resin film laminated on the surface of the molded body.

The results of the evaluation of this laminated molded article are shown in Table 2.

EXAMPLES 9 AND 10

An acrylic resin film having a thickness of 0.13 mm was prepared and a laminated molded article was produced in the same manner as in Example 1 or Example 4 except that the film was cooled by allowing only one surface of the film in contact with a cooling polishing roll instead of allowing the both surfaces in contact with cooling polishing rolls.

The results of the evaluation of the acrylic film and the laminated molded article were shown in Table 2.

EXAMPLE 11

The acrylic resin film, which had been obtained in Example 10, was heated with allowing the both surfaces of the film in contact with a continuous stainless steel belt, and then cooled to obtain an acrylic resin film.

The results of the evaluation of this acrylic resin film are shown in Table 2.

A laminated molded article was produced in the same manner as in Example 1 except that the above prepared acrylic resin film was used in place of the acrylic resin film obtained in Example 1.

The results of the evaluation of this laminated molded article are shown in Table 2.

EXAMPLE 12

The acrylic resin film, which had been obtained in Example 1, was simultaneously laminated on the film of a polycarbonate resin which was being extruded with a single-screw extruder (a barrel type having a diameter of 65 mm, manufactured by Toshiba Machine Co., Ltd.) through a T-shaped film die (a lip clearance of 4 mm and a width of 600 mm; a setting temperature of 280° C.), and then the both surfaces of a laminate were allowed in entire contact with polishing rolls to obtain a laminated film having a thickness of 3 mm.

The results of the evaluation of this laminated film are shown in Table 2.

EXAMPLE 13

A laminated film having a thickness of 3 mm was prepared in the same manner as in Example 12 except that the acrylic resin film obtained in Example 4 was used in place of the acrylic resin film obtained in Example 1.

The results of the evaluation of this laminated film are shown in Table 2.

EXAMPLE 14

A laminated film was prepared by laminating the acrylic resin film obtained in Example 1 on the printed surface of a soft polyvinyl chloride film having a printed carbon design on its surface.

This laminated film was shaped by thermoforming and then inserted in between injection molding molds which were heated at 50° C. Thereafter, a polycarbonate resin was injected under an injection pressure of 1250 kg/cm$^2$ at a resin temperature of 280° C. to perform simultaneous injection molding and lamination and obtain a laminated molded article consisting of the polycarbonate resin layer having a thickness of 3 mm and the laminated film which was laminated on the resin body.

EXAMPLE 15

An inorganic red pigment was compounded in Composition d to obtain Composition d', which was pelletized. The pellets of Composition d' was supplied in a single-screw extruder (a barrel type having a diameter of 45 mm, manufactured by Toshiba Machine Co., Ltd.).

Separately, the pellets of Composition i were supplied in a single-screw extruder (a barrel type having a diameter of 45 mm, manufactured by HITACHI ZOSEN CORPORATION), Then, Compositions d' and i were extruded from the respective extruders through a double layer multi-manifold type film die (a slip clearance of 0.5 mm, a width of 600 nm, and a setting temperature of 250° C.) which was connected to the both extruders, and formed by allowing the both surfaces of the extruded film in entire contact with cooling polishing stainless steel rolls to obtain a laminated film having a total thickness of 0.3 mm (thickness of the red-colored layer: 0.2 mm, thickness of the transparent layer: 0.1 mm).

The results of the evaluation of this laminated film are shown in Table 2.

The laminated film was placed in injection molding molds, which were heated at 50° C., with the transparent layer touching the mold surface, heated with a far-infrared heater and then vacuum shaped. Then, an acrylonitrile-butadiene-styrene (ABS) resin was injected on the surface of the laminated film under an injection pressure of 1150 kg/cm$^2$ at a resin temperature of 230° C. to perform simultaneous injection molding and lamination and obtain a laminated molded article consisting of the ABS resin layer having a thickness of 3 mm and the laminated film which was laminated on the resin body.

The results of the evaluation of the laminated molded article are shown in Table 2.

EXAMPLE 16

A mixture of 100 wt. parts of Composition b and 2 wt. parts (in terms of an aluminum weight) of the aluminum paste was pelletized with a twin-screw extruder (PCM-45 manufactured by IKEKGAI IRONWORKS Co., Ltd.) to obtain silver-metallic colored pellets.

The colored pellets were supplied in a single-screw extruder (a barrel type having a diameter of 65 mm, manufactured by Toshiba Machine Co., Ltd.), while the pellets of Composition i were supplied in a single-screw extruder (a barrel type having a diameter of 45 mm, manufactured by HITACHI ZOSEN CORPORATION).

Then, two kinds of pellets were extruded from the respective extruders through a feed block type multilayer die (a lip face length of 0.5 mm, manufactured by HITACHI ZOSEN CORPORATION) which was connected to the both extruders, and the formed film was shaped by allowing the both surfaces of the extruded film in entire contact with cooling polishing stainless steel rolls to obtain a laminated film consisting of the upper layer of a transparent acrylic resin film and the lower layer of a silver metallic colored acrylic resin film and having a total thickness of 0.5 mm.

This laminated film was a silver metallic colored one having surface gloss and added depth.

A chlorinated polypropylene resin ("No. 822" manufactured by NIPPON PAPER INDUSTRIES, Co., Ltd.) was coated on the surface of the lower layer of the laminated film. Then, the laminated film was placed in molds for injection molding, which were heated at 50° C., with the surface layer touching the mold surface, heated with a far-infrared heater and vacuum shaped (an area expansion ratio of 1.3 times).

Thereafter, a polypropylene resin (SUMITOMO NOBLEN™ BYA81 manufactured by Sumitomo Chemical Co., Ltd.) was injected on the lower layer side under an injection pressure of 1150 kg/cm$^2$ at a resin temperature of 250° C. to perform simultaneous injection molding and lamination and obtain a laminated molded article consisting of the polypropylene resin film having a thickness of 3 mm and the silver metallic colored laminated film which was laminated on the polypropylene resin film.

The surface of the laminated molded article had surface gloss with added depth, and the polypropylene resin film and laminated film were firmly adhered.

EXAMPLE 17

White pellets were prepared in the same manner as in Example 16 except that 5 wt. parts (in terms of titanium oxide) of a titanium oxide powder was used in place of the aluminum paste.

Then, a laminated film was produced in the same manner as in Example 16 except that the above prepared white pellets were used in place of the silver metallic colored pellets. The thickness of the laminated film was 0.5 mm.

This laminated film was a white one having surface gloss and added depth.

EXAMPLE 18

In distilled water containing 18 g/liter of benzyl alcohol, a red disperse dye was dispersed in an amount of 10 g/liter. Then, the acrylic resin film obtained in Example 1 having a thickness of 0.13 mm was stained by dipping it in the obtained staining liquid heated up to 80° C.

The color tone of the stained film was examined by a color difference displaying method according to JIS Z-8730. The results were L* of 86.0, a* of 22.8 and b* of 5.4, which indicated the uniform dyeing.

When a woodgrain pattern was gravure printed on one surface, the pattern alone could be printed on the film surface without the formation of the printed layer of a base primer on the entire surface.

COMPARATIVE EXAMPLE 1

A woodgrain pattern was printed on a commercially available soft acrylic resin film (ACRYPREN™ HBS-001 available from Mitsubishi Rayon Co., Ltd.; thickness of 100 μm) in the same manner as in Examples 1 to 8, and the printed film was warmed with a far-infrared heater at 50° C. in injection molding molds, and vacuum shaped. Thereafter, an ABS resin was injected in a thickness of 3 mm on the back face of the printed film under an injection pressure of 1150 kg/cm$^2$ at a resin temperature of 230° C. to obtain a laminated molded article having an adhered printed film.

The results of the evaluation of the obtained film and the laminated molded article.

It was confirmed by the observation with a transmission electron microscope that the acrylic film HBS-001 contained a large number of particles of a single-layer-structured elastomer having a particle size of 100 nm, but no multilayer-structured acrylic polymer.

TABLE 1

| Com-position | Acrylic resin (wt. parts) | | | | | Tg (° C.) | Mw × 10$^4$ | Acrylic polymer (wt. parts) | | UV radiation absorber (wt. parts) |
| --- | --- | --- | --- | --- | --- | --- | --- | --- | --- | --- |
| | I | II | III | IV | V | | | A | B | LA31 250 |
| a | 80 | | | | | 106 | 14 | 20 | | 0.5 |
| b | | 75 | | | | 95 | 12 | 25 | | 1 |
| c | | | 80 | | | 62 | 30 | 20 | | 0.5 |
| d | | 30 | 50 | | | 78 | 23 | 20 | | 0.5 |
| e | | 25 | | 50 | | 83 | 37 | 25 | | 1 |
| f | | 30 | | | 50 | 65 | 23 | 20 | | 0.5 |
| g | 80 | | | | | 106 | 14 | | 20 | 0.5 |
| h | | 30 | 50 | | | 78 | 23 | | 20 | 0.5 |
| i | 100 | | | | | 106 | 14 | | | 1 |

Notes: Tg = Glass transition temperature.
Mw = Weight average molecular weigh.

TABLE 2

| Ex. No. | Compo-sition | Properties of film ||||| Properties of laminated molded article |||
|---|---|---|---|---|---|---|---|---|
| | | Thickness accuracy | Optical properties || No. of printing mistakes | Surface hardness | Gauze abrasion | Unevenness during molding |
| | | | Tt (%) | Haze (%) | | | | |
| 1 | a | 5 | 93 | 0.8 | 0.1 | H | A | B |
| 2 | b | 6 | 93 | 0.9 | 0.2 | H | A | B |
| 3 | c | 7 | 92 | 1.1 | 0.3 | 2B | B | A |
| 4 | d | 6 | 93 | 0.9 | 0.2 | HB | A | A |
| 5 | e | 7 | 92 | 1.0 | 0.4 | HB | B | A |
| 6 | f | 8 | 92 | 1.2 | 0.3 | B | B | A |
| 7 | g | 6 | 93 | 0.9 | 0.3 | B | A | B |
| 8 | h | 6 | 92 | 1.1 | 0.4 | B | B | A |
| 9 | a | 8 | 92 | 2.5 | 8.2 | HB | B | B |
| 10 | d | 9 | 92 | 3.6 | 7.8 | B | B | A |
| 11 | d | 9 | 93 | 0.2 | 0.1 | HB | A | A |
| 12 | a | 5 | 93 | 0.8 | — | H | A | A |
| 13 | d | 6 | 93 | 0.9 | — | HB | A | A |
| 14 | a | 5 | 93 | 0.8 | 0.1 | HB | A | B |
| 15 | i | 5 | — | — | — | 2H | A | A |
| Comp. 1 | | 14 | 92 | 1.4 | 14.0 | 5B | C | A |

What is claimed is:

1. A method for producing a laminated film having a thickness of 0.1 to 0.6 mm comprising the steps of:

molding an acrylic resin composition and other resin composition to obtain a film-form material by a multilayer extrusion molding method;

allowing both surfaces of said film-form material to touch surfaces of rolls or belts;

wherein said acrylic resin composition comprises (I) 95 to 50 parts by weight of at least one polymer having a glass transition temperature of 60 to 110° C. and a weight average molecular weight of 70,000 to 600,000 selected from the group consisting of polyalkyl methacrylate and a copolymer of an alkyl methacrylate and an alkyl acrylate, and (II) 5 to 50 parts by weight of at least one multilayer-structured acrylic polymer having a particle size of 100 to 500 nm and containing an elastomeric layer selected from the group consisting of (1) a two-layer-structured acrylic polymer consisting of the inner layer made from an elastomer which comprises an alkyl acrylate having 4 to 8 carbon atoms in the alkyl group and a polyfunctional monomer, and the outer layer made from a hard polymer which comprises methyl methacrylate as a main component, and (2) a three-layer-structured acrylic polymer consisting of the innermost layer made from a hard polymer which comprises methyl methacrylate as a main component, the intermediate layer made from an elastomer which comprises an alkyl acrylate having 4 to 8 carbon atoms in the alkyl group and a polyfunctional monomer, and the outermost layer made from a hard polymer comprising methyl methacrylate as a main component.

2. The method for producing a laminated film according to claim 1, wherein said other resin composition is an acrylic resin or a polyolefin resin.

3. The method for producing a laminated film according to claim 1 or 2, wherein said other resin composition is colored.

* * * * *